United States Patent [19]

Edel

[11] 4,196,338

[45] Apr. 1, 1980

[54] ELECTRICALLY HEATED VEHICLE WINDOW

[75] Inventor: Hans D. Edel, Bardenberg, Fed. Rep. of Germany

[73] Assignee: Saint-Gobain Industries, Neuilly-sur-Seine, France

[21] Appl. No.: 823,691

[22] Filed: Aug. 11, 1977

Related U.S. Application Data

[63] Continuation of Ser. No. 465,164, Apr. 29, 1974, abandoned, and a continuation-in-part of Ser. No. 227,074, Feb. 17, 1972, abandoned.

[51] Int. Cl.² .......................... H05B 1/02; E06B 7/12; H05B 3/26
[52] U.S. Cl. ....................................... 219/203; 52/171; 73/73; 200/61.05; 219/522; 219/543; 338/35; 340/602
[58] Field of Search ............... 219/203, 509, 522, 547, 219/543; 200/61.04–61.06; 73/73, 336.5; 318/483; 340/601, 602, 580–582; 338/35, 306–309; 52/170, 171; 296/84 R

[56] References Cited

U.S. PATENT DOCUMENTS

| 2,735,907 | 2/1956 | Inman | 200/61.05 |
| 3,071,746 | 1/1963 | Kohl | 338/35 |
| 3,553,833 | 1/1971 | Jochim et al. | 219/203 |
| 3,555,289 | 1/1971 | Sobkow | 318/483 X |
| 3,649,898 | 3/1972 | Inoue | 318/483 |
| 3,749,885 | 7/1973 | Nagasima | 219/203 X |
| 3,832,527 | 8/1974 | Nagasima | 219/203 X |

FOREIGN PATENT DOCUMENTS

| 727020 | 3/1955 | United Kingdom | 219/522 |
| 894967 | 12/1961 | United Kingdom | 219/203 |

Primary Examiner—A. Bartis
Attorney, Agent, or Firm—Pennie & Edmonds

[57] ABSTRACT

A humidity-responsive heating circuit for a window of an automotive vehicle includes a grid of heating conductors on the window and two conductors closely approaching each other on the surface of the window such that the resistance between them changes, upon the appearance of humidity bridging the space between them, sufficiently to provide a signal. All of the conductors are composed of the same paste having the same properties and are applied as a single baked, silk screen printed pattern. The circuit may further include a switch to apply a voltage between those two conductors, amplifying means responsive to change of resistance between them, and a relay controlled by the amplifying means for connection of the heating grid to a source of voltage.

9 Claims, 5 Drawing Figures

ELECTRICALLY HEATED VEHICLE WINDOW

This is a continuation of application Ser. No. 465,164 filed Apr. 29, 1974, in turn a continuation-in-part of application Ser. No. 227,074 filed Feb. 17, 1972, both of which applications are now abandoned.

The present invention relates to windows such as for example the windshields and rear windows of automotive vehicles, and to method and means for keeping such windows clear of fog and ice. As the invention is of particular use as applied to the windows or windshields of automobiles, it will be described as applied to such a window.

It has been heretofore proposed to provide electrically heated windshields and other windows in which electrical heating means fed by a power source such as the electric storage battery of a motor vehicle are deposited on the inner surface of the window. When energized, these heating means free the inside surface of the window from condensed moisture and the outside surface thereof from snow and sleet. These heating means may take the form of a grid of conductors applied to or incorporated into the window, for example as disclosed in U.S. Pat. No. 3,553,833 which is assigned to the assignee hereof. A switch is provided so that the operator can turn the heating means on and off as needed. The drain on the battery thus continues until the operator thinks to turn it off, which may be long after the window has been cleared of frost and steam. This excess drain on the battery is undesirable from all points of view, as the quantity of energy available is relatively small and such excessive drain can have deleterious effects on the battery.

It is an object of this invention to provide for automatic control of energization of the heater circuit, subject to manual operation of a main on-off switch.

The objects of the invention are accomplished, generally speaking, by using the aqueous deposit on the window to control the heating current. Thus, when a deposit of ice, sleet, or snow forms on the outside of the windshield, or when a condensate forms on the inside, the deposit itself initiates the flow of current, and its disappearance ends the flow until a new deposit forms.

Heating current therefore does not flow unless it is necessary, and the overall consumption of energy is reduced. The invention makes it possible, by selection of a reduced electrical resistance for the heating grid, to increase the heating current drawn from the battery, for a shorter time, without increasing the total power drawn from the battery. In this way it is possible either to provide a higher heating effect per unit area on a heating grid of given dimensions and thereby to dissipate the deposit more quickly, or to produce the same heating effect per unit area over a larger area with a heating grid covering such a larger area on the window.

In theory one should select, as the criterion for operation of the control apparatus, the nature and amount of the deposit (whether ice, frost, snow, sleet or condensate) to be removed from the window by heating, and one should use electrodes appropriate to the conditions to be encountered. In vehicles however, a principal function of such a heater grid is to keep the window free of condensate on the inside surface thereof, and I have found that ice on the outside usually results in the deposit of condensate on the inside from the presence of the occupants of the vehicle. Hence it suffices to have the heating unit activated by the condensate itself, which forms on the inner surface. The activating command is issued electrically. Electrodes mounted on the window and constituting a sensor are electrically connected by the deposit when it forms. Current is thereby caused to flow between those electrodes, and the flowing current controls the connection of the heater to the poles of the battery. The current initiated by the deposit flows to an amplifier which issues an amplified current which activates a relay to close a switch which connects the heater grid across the battery. When the deposit disappears the initiating current is cut off, the relay changes its state of energization, and the battery is disconnected from the heater grid. THe amplifier is mounted at any convenient spot in the electrical system of the car and may be of any appropriate type, the one in the drawing being a four-stage booster of efficient design for this purpose.

In one form of the invention the sensor takes the form of a humidity-responsive switch composed of two electrodes or contacts mounted side by side and close together on the surface of the glass. When the glass is dry no current flows but as soon as a deposit of condensate forms on the glass between the electrodes, current passes between them. Such electrodes may advantageously take the form of two combs with intercalated teeth which are close together without touching.

The invention is particularly advantageous in combination with windows upon which heating grids have been printed and baked. The conductors and electrodes of the sensor circuit may be applied in the same way of the same materials. In particular, the heating apparatus is disposed on the inside surface of a window and is comprised of a plurality of spaced electrical resistance heating conductors. The conductors are connected between bus bars and include at least one additional conductor closely spaced from an adjacent conductor. The conductors and bus bars are composed of the same paste of finely divided metallic particles suspended in a frit and applied to the glass as a single silk screen pattern which is baked to the surface of the glass. The apparatus further comprises a switch for controlling the application of a voltage between the bus bars, and means including means for sensing the electrical resistance between the additional conductor and the adjacent conductor and means responsive to a decline in the electrical resistance due to the presence of moisture on the window surface between the additional conductor and the adjacent conductor for closing the switch to energize the heating conductors.

BRIEF DESCRIPTION OF THE DRAWINGS

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views.

DESCRIPTION OF THE PREFERRED EMBODIMENTS

Figure 1:
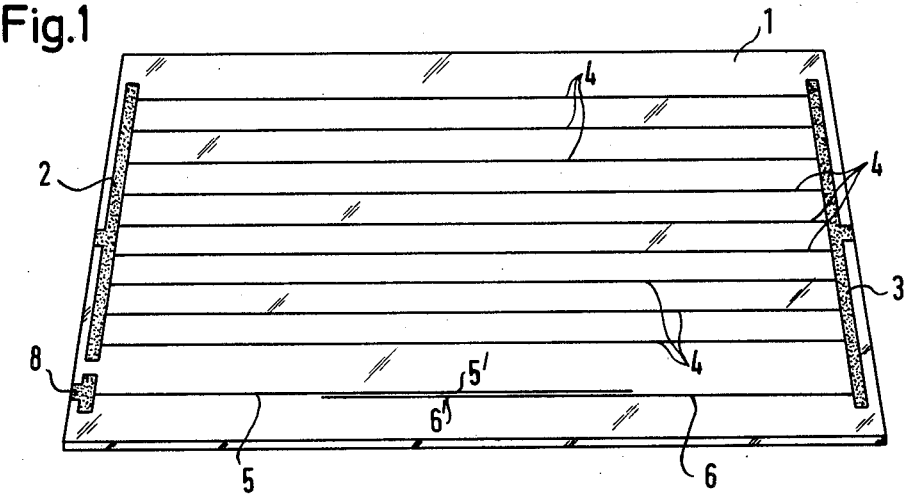
FIG. 1 is a diagrammatic view of a window in accordance with the invention having a heating grid and sensor electrodes applied to one face thereof.

In FIG. 1 the window 1, which may for example be the rear window of an automobile, has on its inner face bus bands 2 and 3 between which extend heating conductors 4 to constitute a heater grid. The grid may be formed by applying to the glass of the window, by the silk screen process, a pattern of conducting lines for the bus bands and heating conductors in the form of a paste of finely-divided silver with an organic binder and a low melting frit. The conducting lines so laid down on the glass are baked to the glass, advantageously during a thermal treatment such as that which precedes the bending or tempering of the glass. The conductors may be reinforced by electroplating as disclosed in U.S. Pat. No. 3,553,833.

Below the heating grid and parallel to the conductors 4 are disposed conductors 5 and 6 having overlapped ends 5' and 6' closely spaced from each other, by comparison to the spacing of adjacent of the conductors 4. The conductors 5 and 6 are similarly constituted with respect to the conductors 4 in the sense that they are made of the same material and applied in the same way and at the same time as the conductors 4. While the spacing of adjacent conductors 4 may be of the order of two or more centimeters, the spacing of the overlapped ends 5' and 6' of the conductors 5 and 6 is preferably of the order of a millimeter or less. The ends 5' and 6' constitute electrodes between which current can flow over the surface of the glass in the event of the appearance of moisture there, i.e. in the event of the appearance of moisture on the glass and in contact with the electrodes 5' and 6'. Conductor 6 is connected to bus band 3 and through it to one pole of the vehicle battery, and conductor 5 is connected to a terminal 8, separate from bus band 2. The flow of current between the conductors 5 and 6 across the surface of the glass, i.e. across the surface of the glass between the closely spaced electrodes 5' and 6', is used as a measure of the humidity on the glass, and hence of the necessity for energizing the heater conductors 4. While pure water is a non-conductor, there is in practice present on the surface of the glass between the electrodes 5' and 6' sufficient salts or other contaminants so that the resistance between those electrodes declines significantly upon the appearance of moisture there.

Electrodes 5' and 6' may thus be described as a sensor for detection of the presence of moisture on the surface of the window to which those electrodes are applied.

Figure 2:
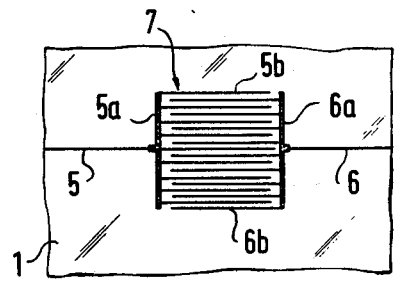
FIG. 2 is a view of a preferred form of sensor.

In FIG. 2 a preferred form of sensor is shown at 7. The conductors 5 and 6, like those of FIG. 1, connect to relatively wide transverse conductors or bus bands 5a and 6a, from which there extend respectively two series of finer intercalated or interdigitated conductors 5b and 6b, none of the conductors 5b contacting any of the conductors 6b. In one sensor of the type illustrated in FIG. 2, the conductors 5b and 6b were 0.8 mm. wide with adjacent intercalated conductors 5b and 6b spaced on centers by a distance of 1 mm., so that the separation of such adjacent conductros was 0.2 mm.

As soon as a deposit of condensate sufficient to obscure vision through the window occurs on the surface of the window to which the sensor is applied, the electrical impedance between the terminals of the sensor, i.e. between the conductors 5 and 6 in FIG. 1 or FIG. 2, decreases sufficiently to permit a current to flow between those terminals of a value which is made effective by amplification to close the relay-operated switch controlling the heater grid.

According to a further feature of the invention, the surface of the glass at the intended location of the sensor is roughened before the sensor conductors are applied in order to make that surface more hydrophilic. The roughening may be effected by means of a sandblast, and means other than roughening may be employed to make the glass more hydrophilic and hence to make the sensor more responsive.

The sensor should be located on the window rather close to the heater grid so that the heater grid will aid in clearing moisture from the gap between the sensor electrodes. The system will normally be placed on the inside of the car window, which has the advantage of developing the heat first on the face of the glass which must be kept free from condensate. In that arrangement the sensor is controlled by the condensate alone. A plurality of sensors may be connected in parallel. Printed and baked lines which may also be plated are equally useful in cases wherein the heater is an interlayer in a laminated windshield or is embedded in the interlayer of such a laminate.

Figure 3:
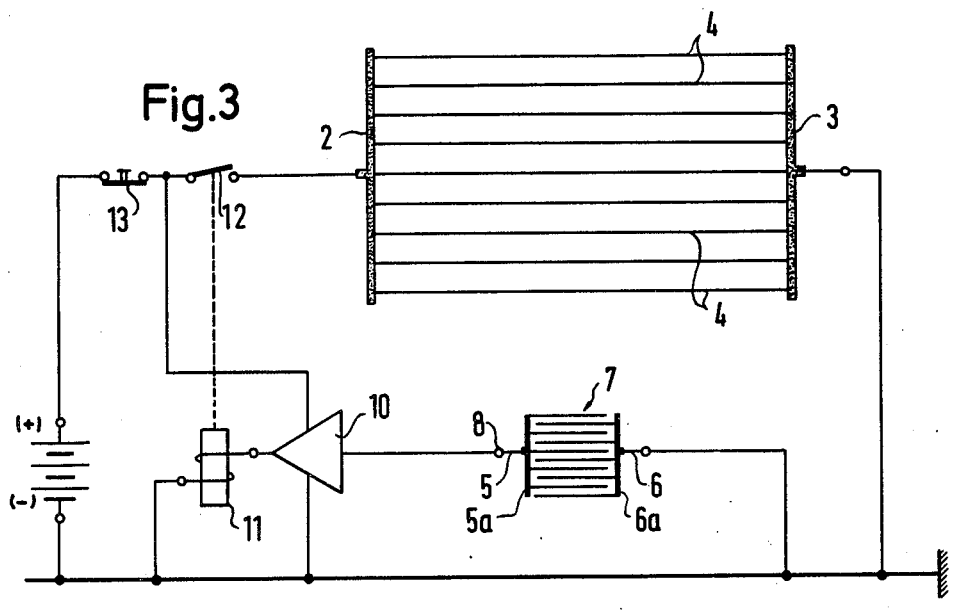
FIG. 3 is a schematic diagram of one preferred form of the invention including amplifying means to control application of heating current to the window in accordance with signals developed at the sensor.

A circuit for use of the variation in resistance between conductors of the sensor for control of energization of the heater grid is diagrammatically shown in FIG. 3. In FIG. 3 the conductors 5 and 6 lead to intercalated electrodes 5b and 6b of a sensor of the type illustrated in FIG. 2.

In FIG. 3 the heater grid comprising bus bands 2 and 3 and heater conductors 4 is seen to be connected in series with a manually operable on-off switch 13 and with a normally open relay controlled switch 12 across a battery. Sensor terminal 6 connects to the negative pole of the battery and terminal 5 connects to the positive pole of the battery (when manual switch 13 is closed). In addition an amplifier 10 functions as a switch to control connection of the actuating coil of a relay 11 across the battery. The amplifier, which is supplied with operating voltages from the battery, has the sensor 7 connected across its input and may be regarded as amplifying the current through the sensor to the extent necessary to energize the relay when, through the deposit of moisture on the window, the current through the sensor rises to a sufficient level. Upon energization of the relay 11, a normally open contact 12 on the relay is closed and the battery voltage is applied to the heater grid. The connection of terminal 5 to the positive battery is shown as occurring through the amplifier, and may include a current-limiting resistor, as indicated in FIG. 4.

Thus in operation, when in FIG. 3 the conductors 5b and 6b of the sensor are bridged by an aqueous deposit, current will be caused to flow through the relay coil to close the contact 12. Battery voltage will be applied to the heater grid, and heating continues until the surface of the glass at the location of the sensor is dried by heat. Thereupon the relay will be de-energized, the contact 12 will return to open position, and the heater grid will be disconnected from the battery.

Figure 4:
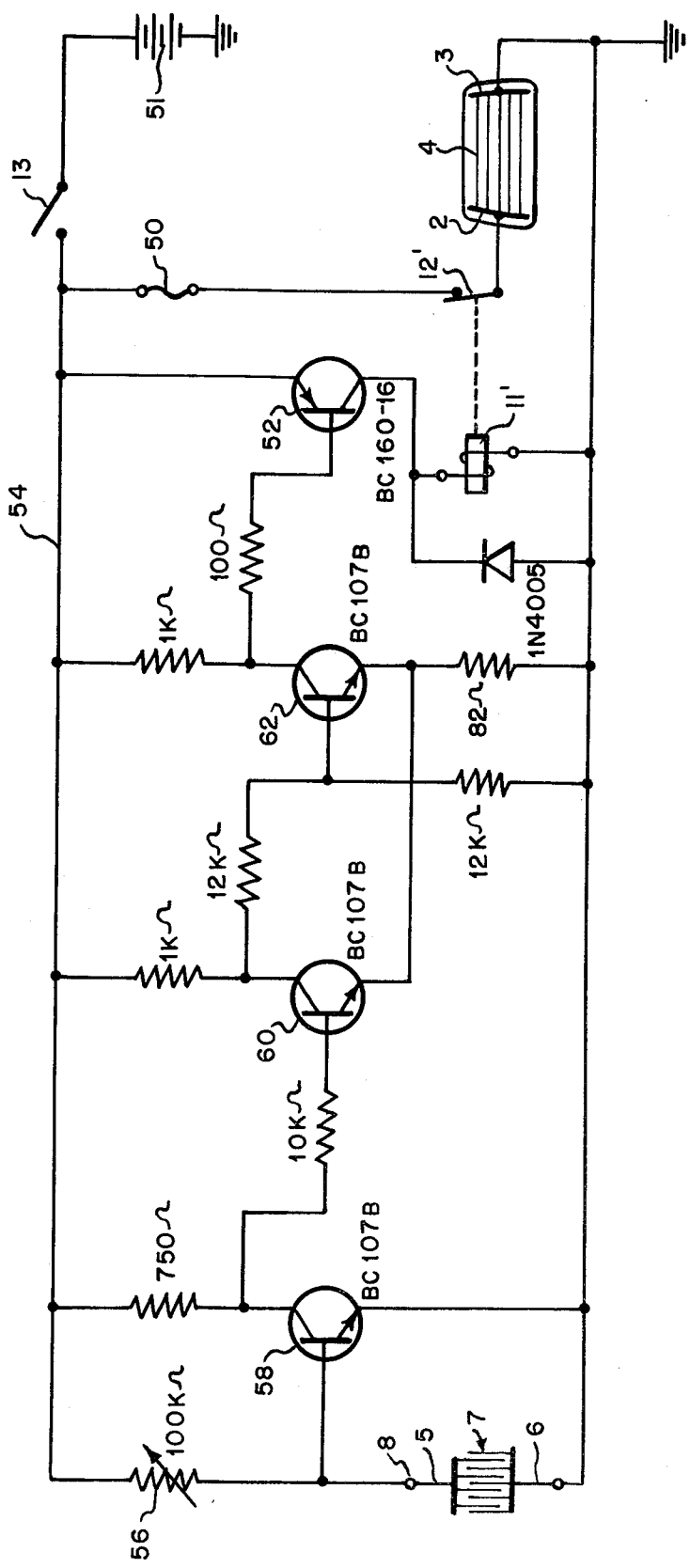
FIG. 4 is a schematic diagram of an amplifying circuit shown in conjunction with the other elements of a preferred embodiment of the invention.

FIG. 4 shows another embodiment of the invention in which the window of the invention is combined with an amplifying circuit responsive to changes in current through the sensor for the control of the heating current. A manually operable switch 13 connects a conductor 54 to one pole of a battery 51, the other pole of which is grounded. In FIG. 4 the heater grid comprising conductors 4 and bus bands 2 and 3 on the window 5 is connected in series with the switch 13, with a fuse 50, and with a normally closed contact 12' of a relay 11' across the battery. Contact 12' is thus closed when the relay 11' is de-energized and it is open when that relay is energized. The actuating coil of the relay 11' is connected in series with the emitter-collector conduction path of a PNP transistor 52.

The sensor 7, which may be of the type shown in FIG. 2, is disposed on the window adjacent conductors 4. It is connected in series with a current-limiting resistor 56 between conductor 54 and ground. The junction of resistor 56 and sensor 7 connects to the base of an NPN transistor 58 whose collector connects to conductor 54 through a current-limiting resistor. Transistor 58 is followed by two further NPN transistors 60 and 62 connected in a bi-stable trigger circuit whose function is to shift the power stage PNP transistor 52 between conducting and non-conducting conditions.

When the window is dry, sensor 7 exhibits a high resistance and the base of transistor 58 will be at relatively high potential, causing that transistor to conduct at a relatively high current level. The consequence of this state of conduction of transistor 58 is to make transistor 60 non-conducting and to make transistor 62 conducting. Conduction in transistor 62 lowers the voltage of the base of PNP transistor 52 below the voltage of the emitter of transistor 52. The base of transistor 52 being below its emitter, transistor 52 will conduct, relay 11' will be energized, contact 12' will be opened, and the heater grid will be disconnected from the battery. Upon the appearance of moisture on the window between the electrodes of sensor 7, the resistance of the sensor falls, current flow through it increases, and the voltage drop across resistor 56 increases. The base of transistor 58 therefore moves to a lower potential. Conduction in transistor 58 is thereby reduced, and the base of transistor 60 is therefore raised in potential. Transistor 60 is rendered conductive, transistor 62 is rendered non-conductive, and the base of transistor 52 rises to the same level as its emitter. Conduction therefore ceases in transistor 52, so that the relay 11' is de-energized. Contact 12' accordingly closes and the heater grid is connected across the battery.

Figure 5:
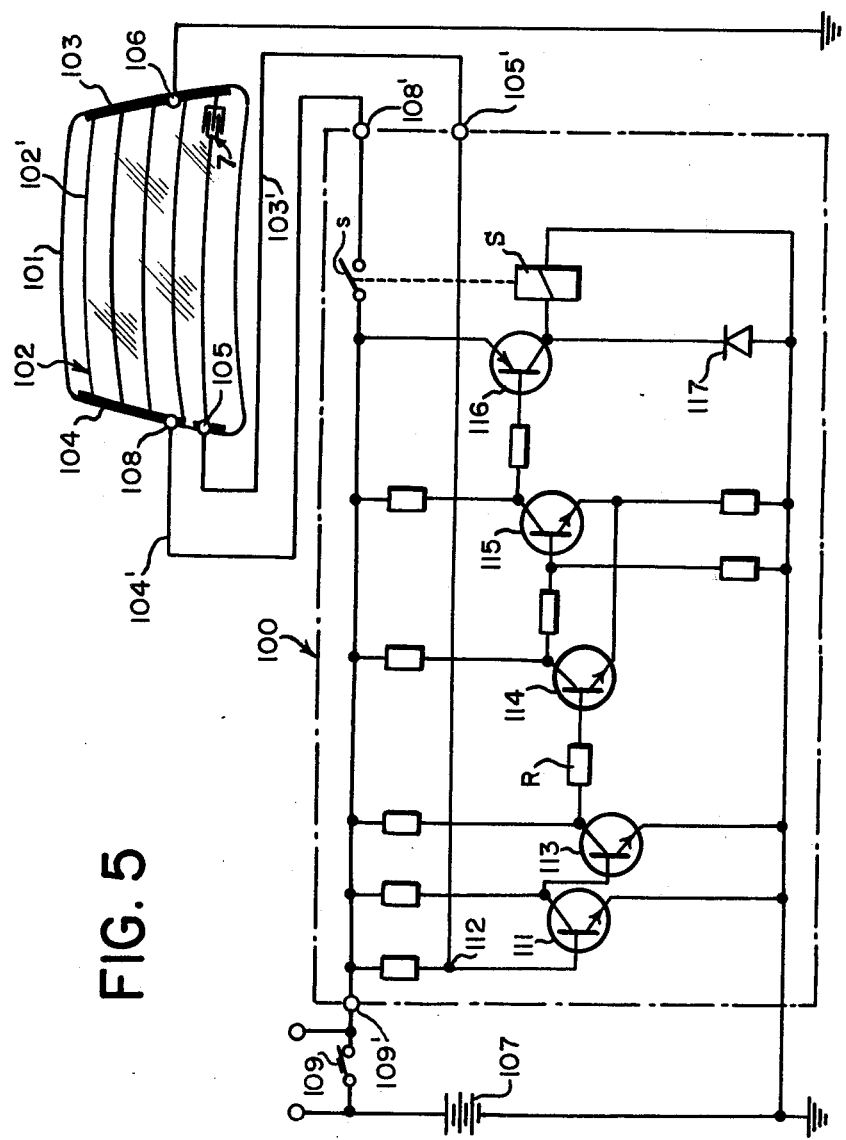
FIG. 5 is another diagram similar to that of FIG. 4 showing a presently preferred amplifying circuit.

Referring now to FIG. 5, there is there shown in diagrammatic pictorial fashion a window 101 such as a windshield or rear window of an automotive vehicle, bearing a heater or defroster grid generally indicated at 102, including conductive resistance strips 102'. These extend approximately or substantially geometrically parallel to each other over the portion of the window of interest at a spacing from each other which may be of the order of centimeters. These conducting strips are connected electrically in parallel between bus bars 103 and 104 having terminals 106 and 108 respectively. There is also applied to an exterior surface of the window (as distinguished from an interior surface, in the case of a laminated window such as a windshield), preferably that which is turned to the inside of the vehicle, a humidity detector or sensor 7, which may be of the type shown in FIG. 2. In the sensor 7 one electrode may connect to one of the bus bars as indicated at 103. The other leads to an independent terminal 105. The window with its defroster grid 102 and humidity sensor 7 may be of the type illustrated in FIG. 1 or in FIGS. 1 and 2.

In the circuit of FIG. 5 the terminal 106 for the bus band 103 is grounded as is the negative pole of the source of electrical energy for the vehicle, indicated as a battery 107. The terminal 108 of the bus band 104 connects via a lead 104' to a terminal 108' of a control unit identified by the dash line box 100. Terminal 105 of the detector 7 connects via a lead 103' to another terminal 105' on the control unit 100. The control unit comprises an amplifier and relay-controlled switch responsive to variation in resistance between the electrodes of sensor 7 to control the application of heating current to the grid 102.

The terminal 108' leads through the normally open contact s of a relay S to the signal input terminal 109' of the control unit. A manually operable switch 109, which may be coupled to the ignition switch of the vehicle to be closed when the ignition is turned on, applies power from the source 107 to the terminal 109'. Accordingly with switch 109 closed, power will be applied by the source 107, for example in the form of 12 volts D.C., to the heating grid 102 on the window whenever contact s is closed.

The control unit 100 includes in addition to the relay S a circuit to control energization of that relay. This circuit comprises essentially a first transistor 111 connected at 112 to the terminal 105' and thereby to the detector 7, the detector 7 constituting the input impedance to this transistor. Transistor 111 is connected in a circuit so as to effect preamplification. It is followed by an amplifying stage comprising the transistor 113, which controls a two-level flip-flop including transistors 114 and 115. The flip-flop in turn controls a power stage comprising the transistor 116 which is connected in series with the actuating coil of the relay S and which is protected by the diode 117.

Provided of course the switch 109 is closed, the contact s is thus closed by the relay S, and the heating grid 102 is energized, whenever the detector 7 becomes sufficiently conductive, upon the formation of a deposit of humidity there from whatever cause.

In preferred embodiments of the invention, the heater conductors, the bus bands therefor, and the additional conductors which make up the sensor, its leads and terminal or terminals, are all of the same material and are all laid down in a single silk screen operation from a paste of finely-divided silver particles suspended with an organic binder in a low melting point frit. The conductors as so laid down in paste form are then baked to the glass at a temperature of the order of 600° C., e.g. in the course of a bending or tempering operation, when the window is a window or windshield of an automotive vehicle. The conductors so baked to the glass may then additionally be provided with electroplated coatings of copper, nickel and chromium, as disclosed in U.S. Pat. No. 3,553,833.

The invention thus provides a window for a vehicle comprising a sheet of glass, electrical resistance heating means supported by the sheet of glass, and at least two conductors applied to a surface of the sheet of glass and having between them a minimum spacing small enough to exhibit variations in resistance between those conductors with variation in the humidity of that surface of the glass between those conductors. The conductors may comprise combs having interdigitated teeth, and the minimum spacing may be of the order of 1 millimeter. The electrical resistance heating means may comprise a plurality of resistive conductors applied to a surface of the sheet of glass. The conductors may include a suspension of conductive metallic particles in a frit laid down on a surface of the sheet of glass by a silk screen process and baked to that surface, and the electrical resistance heating means may comprise a plurality of resistive conductors including a suspension of conductive metallic particles in a frit laid down in the same step by the same silk screen process as the first-named conductors and baked to a surface of the sheet of glass in the same baking step as those first-named conductors.

The invention also provides apparatus for heating a glass window comprising, on the inside surface of a window, a plurality of electrical resistance heating conductors connected between bus bars and at least one additional conductor on that surface closely spaced from an adjacent conductor on that surface, the conductors and bus bars being composed of a paste of finely divided metallic particles suspended in a frit applied to the glass in a single step by the silk screen process and baked to the surface of the glass, the apparatus further comprising a switch for controlling the application of a voltage between the bus bars, and means responsive to a decline in the electrical resistance between the additional conductor and the adjacent conductor to close the switch. The surface of the window between the additional conductor and the adjacent conductor may be hydrophilic, for example sand-blasted. The means responsive to a decline in electrical resistance may include an amplifier having the resistance between the additional conductor and adjacent conductor connected in its input, and a switch actuated by a relay having an actuating coil connected in the output of that amplifier. The surface of the window between the additional conductor and the adjacent conductor is desirably within the area heated by said heating conductors. The additional conductor and the adjacent conductor each advantageously comprise a plurality of conducting lines interdigitated between the conducting lines of the other. The heating conductors, additional conductor and adjacent conductor desirably include electroplated coatings.

While the invention has been described hereinabove in terms of a number of presently preferred exemplary embodiments, the invention itself is not limited thereto but rather comprehends all modifications of and departures from those embodiments properly falling within the spirit and scope of the appended claims.

I claim:

1. Apparatus for heating a glass window comprising, on the inside surface of a window, a plurality of spaced electrical resistance heating conductors connected between bus bars and at least one additional conductor on said surface closely spaced from an adjacent conductor on said surface, said conductors and bus bars being composed of the same paste of finely divided metallic particles suspended in a frit applied to the glass in a single step by a silk screen process and baked to the surface of the glass to define a baked, silk screen printed pattern on said surface, said apparatus further comprising a switch for controlled the application of a voltage between said bus bars, and control means including means for sensing the electrical resistance between said additional conductor and said adjacent conductor and means responsive to a decline in said electrical resistance due to the presence of moisture on said window surface between said additional conductor and said adjacent conductor for closing said switch to energize said heating conductors.

2. A window according to claim 1 in which the spacing between said additional conductor and said adjacent conductor is of the order of 1 millimeter.

3. Apparatus according to claim 1 wherein the surface of the window between said additional conductor and adjacent conductor is treated to render it hydrophilic.

4. Apparatus according to claim 1 wherein the surface of the window between said additional conductor and adjacent conductor is sand-blasted to render said surface hydrophilic.

5. Apparatus according to claim 1 wherein said control means includes means to apply a voltage between said additional conductor and said adjacent conductor and an amplifier having the resistance between said additional conductor and adjacent conductor connected in its input and wherein said switch is actuated by a relay having an actuating coil connected in the output of said amplifier.

6. Apparatus according to claim 1 wherein the surface of the window between said additional conductor and said adjacent conductor is within the area heated by said heating conductors.

7. Apparatus according to claim 1 wherein said additional conductor and said adjacent conductor each comprise a plurality of conducting lines interdigitated between the conducting lines of the other.

8. Apparatus for heating a glass window comprising, on the inside surface of a window, a plurality of spaced electrical resistance heating conductors connected between bus bars and at least one additional conductor on said surface closely spaced from an adjacent conductor on said surface, said conductors and bus bars being composed of the same paste of finely divided metallic particles suspended in a frit applied to the glass as a single silk screen pattern baked to the surface of the glass, said apparatus further comprising a switch for controlling the application of a voltage between said bus bars, and control means including means for sensing the electrical resistance between said additional conductor and said adjacent conductor and means responsive to a decline in said resistance due to the presence of moisture on said window surface between said additional conductor and said adjacent conductor for closing said switch to energize said heating conductors.

9. Apparatus for heating a glass window for a vehicle comprising: a sheet of glass, a plurality of electrical resistance heating conductors extending across the glass on the inside surfaces thereof from one side thereof to the other, first and second bus bars at the sides of the glass on the inside surface thereof between which said heating conductors are connected, at least one additional conductor on said surface extending part way across said surface from said one side of said glass and connected to the bus bar located at said one side, an adjacent conductor on said surface and extending part way thereacross from the other side of the glass and into closely spaced overlapping relation with the additional conductor, and a third bus bar at the other side of the glass separate from the first and second bus bars and connected to the adjacent conductor, all of said conductors extending across said glass in a generally spaced parallel relation with each other, said conductors and bus bars being composed of the same paste of finely divided metallic particles suspended in a frit and defining a baked, silk screen printed pattern on said surface, said apparatus further comprising means for connecting the bus bars to a source of power, a switch for controlling the application of a voltage between the first and second bus bars, and control means including means for sensing the electrical resistance between the overlapped portions of the additional conductor and the adjacent conductor and means responsive to the decline in said resistance due to the presence of moisture on said window surface between said overlapped portions for closing said switch to energize said heating conductors.

* * * * *